(12) United States Patent
Pinette et al.

(10) Patent No.: US 9,151,397 B2
(45) Date of Patent: Oct. 6, 2015

(54) MOLDED WATERWAY FOR A TWO HANDLE FAUCET

(75) Inventors: Thomas C. Pinette, Maynard, MA (US); Kurt J. Thomas, Indianapolis, IN (US); Christopher Michael McGuire, Fishers, IN (US); Garry Robin Marty, Fishers, IN (US); Brian Alan Enlow, Fishers, IN (US)

(73) Assignees: Delta Faucet Company, Indianapolis, IN (US); Mercury Plastics, Inc., Middlefield, OH (US)

( * ) Notice: Subject to any disclaimer, the term of this patent is extended or adjusted under 35 U.S.C. 154(b) by 1030 days.

(21) Appl. No.: 12/935,506

(22) PCT Filed: Apr. 10, 2009

(86) PCT No.: PCT/US2009/040207
§ 371 (c)(1),
(2), (4) Date: Sep. 29, 2010

(87) PCT Pub. No.: WO2009/126887
PCT Pub. Date: Oct. 15, 2009

(65) Prior Publication Data
US 2011/0259456 A1    Oct. 27, 2011

Related U.S. Application Data

(63) Continuation of application No. 61/123,714, filed on Apr. 10, 2008.

(51) Int. Cl.
*E03C 1/042*    (2006.01)
*F16K 11/074*    (2006.01)
(Continued)

(52) U.S. Cl.
CPC ............... *F16K 11/20* (2013.01); *F16K 27/045* (2013.01); *Y10T 137/87579* (2015.04)

(58) Field of Classification Search
CPC ..... F16K 19/006; F16K 11/20; F16K 11/207; F16K 11/0743; E03C 1/021; E03C 2001/026; E03C 1/0403; E03C 1/0412; Y10T 137/6017; Y10T 137/87579; Y10T 137/9464; Y10T 137/87684
USPC .................. 137/603, 801, 315.12, 606; 4/678
See application file for complete search history.

(56) References Cited

U.S. PATENT DOCUMENTS

| 2,200,091 | A | 5/1940 | Kovach |
| 2,219,471 | A | 10/1940 | Davis |
| 2,546,327 | A | 3/1951 | Young |

(Continued)

FOREIGN PATENT DOCUMENTS

| DE | 10133041 | 1/2003 |
| EP | 0 632 220 | 1/1995 |

(Continued)

OTHER PUBLICATIONS

International Search Report and Written Opinion for PCT Application No. PCT/US2009/040207, issued Jun. 19, 2009, 57 pgs.

(Continued)

*Primary Examiner* — Atif Chaudry
(74) *Attorney, Agent, or Firm* — Faegre Baker Daniels LLP

(57) ABSTRACT

A molded waterway assembly for a centerset faucet including a hot water inlet tube and a cold water inlet tube overmolded within a coupler.

22 Claims, 6 Drawing Sheets

(51) Int. Cl.
*F16K 11/20* (2006.01)
*F16K 27/04* (2006.01)

(56) References Cited

U.S. PATENT DOCUMENTS

| | | | |
|---|---|---|---|
| 2,548,933 A | 4/1951 | Barnett | |
| 2,654,390 A * | 10/1953 | Archer et al. | 137/606 |
| 2,781,786 A | 2/1957 | Young | |
| 2,884,007 A | 4/1959 | Green | |
| 3,229,710 A | 1/1966 | Keller, III | |
| 3,422,849 A | 1/1969 | Manoogian | |
| 3,448,768 A | 6/1969 | Keller | |
| 3,505,098 A | 4/1970 | Miller et al. | |
| 3,520,325 A | 7/1970 | Stuart | |
| 3,580,289 A | 5/1971 | James et al. | |
| 3,590,876 A | 7/1971 | Young | |
| 3,600,723 A | 8/1971 | Mongerson et al. | |
| 3,714,958 A | 2/1973 | Johnson et al. | |
| 3,757,824 A | 9/1973 | Parkhurst et al. | |
| 3,770,004 A | 11/1973 | Johnson et al. | |
| 3,796,380 A | 3/1974 | Johnson et al. | |
| 3,807,453 A | 4/1974 | Dom et al. | |
| 3,854,493 A | 12/1974 | Farrell | |
| 3,965,936 A | 6/1976 | Lyon | |
| 3,989,787 A | 11/1976 | Scott, Jr. et al. | |
| 3,998,240 A | 12/1976 | Liautaud | |
| 4,026,328 A | 5/1977 | Nelson | |
| 4,058,289 A | 11/1977 | Hicks | |
| 4,076,279 A | 2/1978 | Klotz et al. | |
| 4,103,709 A | 8/1978 | Fischer | |
| 4,130,136 A | 12/1978 | Garnier et al. | |
| 4,221,338 A | 9/1980 | Shames et al. | |
| 4,316,870 A | 2/1982 | Rowley | |
| 4,337,795 A | 7/1982 | Argyris et al. | |
| 4,356,574 A | 11/1982 | Johnson | |
| 4,357,957 A | 11/1982 | Bisonaya et al. | |
| 4,387,738 A | 6/1983 | Bisonaya et al. | |
| 4,397,330 A | 8/1983 | Hayman | |
| 4,415,389 A | 11/1983 | Medford et al. | |
| 4,446,084 A | 5/1984 | Rowley | |
| 4,453,567 A | 6/1984 | MacDonald | |
| 4,458,839 A | 7/1984 | MacDonald | |
| 4,484,600 A * | 11/1984 | Peterson et al. | 137/801 |
| 4,502,507 A | 3/1985 | Hayman | |
| 4,513,769 A | 4/1985 | Purcell | |
| 4,525,136 A | 6/1985 | Rowley | |
| 4,552,171 A | 11/1985 | Farrell et al. | |
| 4,577,835 A | 3/1986 | Holycross et al. | |
| 4,580,601 A | 4/1986 | Schlotman et al. | |
| 4,592,388 A | 6/1986 | Wilcox | |
| 4,607,659 A | 8/1986 | Cole | |
| 4,610,429 A | 9/1986 | Arnold et al. | |
| 4,626,005 A | 12/1986 | Stifter | |
| 4,635,673 A | 1/1987 | Gerdes | |
| 4,649,958 A | 3/1987 | Purcell | |
| 4,652,263 A | 3/1987 | Herweck et al. | |
| 4,664,423 A | 5/1987 | Rowley | |
| 4,667,987 A | 5/1987 | Knebel | |
| 4,671,316 A | 6/1987 | Botnick | |
| 4,687,025 A | 8/1987 | Kahle et al. | |
| 4,700,928 A | 10/1987 | Marty | |
| 4,708,172 A | 11/1987 | Riis | |
| 4,749,003 A | 6/1988 | Leason | |
| 4,754,993 A | 7/1988 | Kraynick | |
| 4,760,871 A | 8/1988 | Vijay | |
| 4,762,143 A | 8/1988 | Botnick | |
| 4,773,348 A | 9/1988 | Rowley | |
| 4,783,303 A | 11/1988 | Imgram | |
| 4,803,033 A | 2/1989 | Rowley | |
| 4,838,304 A | 6/1989 | Knapp | |
| 4,853,164 A | 8/1989 | Kiang et al. | |
| 4,877,660 A | 10/1989 | Overbergh et al. | |
| 4,887,642 A | 12/1989 | Bernat | |
| 4,942,644 A | 7/1990 | Rowley | |
| 4,957,135 A | 9/1990 | Knapp | |
| 4,971,112 A | 11/1990 | Knapp | |
| 4,979,530 A | 12/1990 | Breda | |
| 5,001,008 A | 3/1991 | Tokita et al. | |
| 5,006,207 A | 4/1991 | Peterman et al. | |
| 5,024,419 A | 6/1991 | Mulvey | |
| 5,027,851 A | 7/1991 | Drees et al. | |
| 5,053,097 A | 10/1991 | Johansson et al. | |
| 5,090,062 A | 2/1992 | Hochstrasser | |
| 5,095,554 A | 3/1992 | Gloor | |
| 5,100,565 A | 3/1992 | Fujiwara et al. | |
| 5,110,044 A | 5/1992 | Bergmann | |
| 5,127,814 A | 7/1992 | Johnson et al. | |
| 5,131,428 A | 7/1992 | Bory | |
| 5,148,837 A | 9/1992 | Ågren et al. | |
| 5,150,922 A | 9/1992 | Nakashiba et al. | |
| 5,219,185 A | 6/1993 | Oddenino | |
| 5,279,333 A | 1/1994 | Lawrence | |
| 5,340,018 A | 8/1994 | Macdonald et al. | |
| 5,364,135 A | 11/1994 | Anderson | |
| 5,366,253 A | 11/1994 | Nakashiba et al. | |
| 5,375,889 A | 12/1994 | Nakashiba et al. | |
| 5,397,102 A | 3/1995 | Kingman | |
| 5,417,242 A | 5/1995 | Goncze | |
| 5,437,345 A | 8/1995 | Schmidt et al. | |
| 5,493,873 A | 2/1996 | Donselman et al. | |
| 5,494,259 A | 2/1996 | Peterson | |
| 5,518,027 A | 5/1996 | Saiki et al. | |
| 5,527,503 A | 6/1996 | Rowley | |
| 5,553,935 A | 9/1996 | Burnham et al. | |
| 5,555,912 A | 9/1996 | Saadi et al. | |
| 5,558,128 A | 9/1996 | Pawelzik et al. | |
| 5,566,707 A | 10/1996 | Ching et al. | |
| 5,573,037 A | 11/1996 | Cole et al. | |
| 5,577,393 A | 11/1996 | Donselman et al. | |
| 5,579,808 A | 12/1996 | Mikol et al. | |
| 5,582,438 A | 12/1996 | Wilkins et al. | |
| 5,586,746 A | 12/1996 | Humpert et al. | |
| 5,611,093 A | 3/1997 | Barnum et al. | |
| 5,615,709 A | 4/1997 | Knapp | |
| 5,622,210 A | 4/1997 | Crisman et al. | |
| 5,622,670 A | 4/1997 | Rowley | |
| 5,642,755 A | 7/1997 | Mark et al. | |
| 5,660,692 A | 8/1997 | Nesburn et al. | |
| 5,669,407 A | 9/1997 | Bailey | |
| 5,669,417 A | 9/1997 | Lian-Jie | |
| 5,669,595 A | 9/1997 | Bytheway | |
| 5,685,341 A | 11/1997 | Chrysler et al. | |
| 5,687,952 A | 11/1997 | Arnold et al. | |
| 5,695,094 A | 12/1997 | Burnham et al. | |
| 5,725,008 A | 3/1998 | Johnson | |
| 5,730,173 A | 3/1998 | Sponheimer | |
| 5,741,458 A | 4/1998 | Rowley | |
| 5,746,244 A | 5/1998 | Woolley, Sr. et al. | |
| 5,756,023 A | 5/1998 | Stachowiak | |
| 5,758,690 A | 6/1998 | Humpert et al. | |
| 5,775,587 A | 7/1998 | Davis | |
| 5,803,120 A | 9/1998 | Bertoli | |
| 5,813,435 A | 9/1998 | Knapp | |
| 5,833,279 A | 11/1998 | Rowley | |
| 5,850,855 A | 12/1998 | Kerschbaumer et al. | |
| 5,857,489 A | 1/1999 | Chang | |
| 5,861,200 A | 1/1999 | Rowley | |
| 5,865,473 A | 2/1999 | Semchuchk et al. | |
| 5,875,809 A | 3/1999 | Barrom | |
| 5,893,387 A | 4/1999 | Paterson et al. | |
| 5,895,695 A * | 4/1999 | Rowley | 428/36.9 |
| 5,916,647 A | 6/1999 | Weinstein | |
| 5,924,451 A | 7/1999 | Kuo | |
| 5,927,333 A | 7/1999 | Grassberger | |
| 5,934,325 A | 8/1999 | Brattoli et al. | |
| 5,937,892 A | 8/1999 | Meisner et al. | |
| 5,944,225 A | 8/1999 | Kawolics | |
| 5,950,663 A | 9/1999 | Bloomfield | |
| 5,960,490 A | 10/1999 | Pitsch | |
| 5,965,077 A | 10/1999 | Rowley et al. | |
| 5,975,143 A | 11/1999 | Järvenkylä et al. | |
| 5,979,489 A * | 11/1999 | Pitsch | 137/359 |
| 6,013,382 A | 1/2000 | Coltrinari et al. | |
| 6,023,796 A | 2/2000 | Pitch | |

(56) References Cited

U.S. PATENT DOCUMENTS

| | | | |
|---|---|---|---|
| 6,029,860 A | 2/2000 | Donselman et al. |
| 6,029,948 A | 2/2000 | Shafer |
| 6,044,859 A | 4/2000 | Davis |
| 6,053,214 A | 4/2000 | Sjoberg et al. |
| 6,062,251 A | 5/2000 | Pitch |
| 6,070,614 A | 6/2000 | Holzheimer et al. |
| 6,070,916 A | 6/2000 | Rowley |
| 6,073,972 A | 6/2000 | Rivera |
| 6,079,447 A | 6/2000 | Holzheimer et al. |
| 6,082,407 A | 7/2000 | Paterson et al. |
| 6,082,780 A | 7/2000 | Rowley et al. |
| 6,085,784 A | 7/2000 | Bloom et al. |
| 6,116,884 A | 9/2000 | Rowley |
| 6,123,232 A | 9/2000 | Donselman et al. |
| 6,131,600 A | 10/2000 | Chang |
| 6,138,296 A | 10/2000 | Baker |
| 6,155,297 A | 12/2000 | MacAusland et al. |
| 6,161,230 A | 12/2000 | Pitsch |
| 6,170,098 B1 | 1/2001 | Pitsch |
| 6,177,516 B1 | 1/2001 | Hudak |
| 6,202,686 B1 | 3/2001 | Pitsch et al. |
| 6,227,464 B1 | 5/2001 | Allmendinger et al. |
| 6,238,575 B1 | 5/2001 | Patil |
| 6,256,810 B1 | 7/2001 | Baker |
| 6,270,125 B1 | 8/2001 | Rowley et al. |
| 6,286,808 B1 | 9/2001 | Slothower et al. |
| 6,287,501 B1 | 9/2001 | Rowley |
| 6,293,336 B1 | 9/2001 | Emerick, Sr. et al. |
| 6,296,017 B2 | 10/2001 | Kimizuka |
| 6,305,407 B1 | 10/2001 | Selby |
| 6,305,663 B1 * | 10/2001 | Miller ..................... 251/129.04 |
| 6,315,715 B1 | 11/2001 | Taylor et al. |
| 6,328,059 B1 | 12/2001 | Testori et al. |
| 6,334,466 B1 | 1/2002 | Jani et al. |
| 6,341,617 B1 | 1/2002 | Wilson |
| 6,349,733 B1 | 2/2002 | Smith |
| 6,378,790 B1 | 4/2002 | Paterson et al. |
| 6,385,794 B1 | 5/2002 | Miedzius et al. |
| 6,439,581 B1 | 8/2002 | Chang |
| 6,462,167 B1 | 10/2002 | Nodera et al. |
| 6,464,266 B1 | 10/2002 | O'Neill et al. |
| 6,485,666 B1 | 11/2002 | Rowley |
| 6,557,907 B2 | 5/2003 | Rowley |
| 6,609,732 B1 | 8/2003 | Souvatzidis et al. |
| 6,635,334 B1 | 10/2003 | Jackson et al. |
| 6,640,357 B1 | 11/2003 | Chang |
| 6,732,543 B2 | 5/2004 | Jenkins, Jr. et al. |
| 6,770,376 B2 | 8/2004 | Chen |
| 6,770,384 B2 | 8/2004 | Chen |
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,894,115 B2 | 5/2005 | Botros |
| 6,902,210 B1 | 6/2005 | Rowley |
| 6,920,899 B2 | 7/2005 | Haenlein et al. |
| 6,959,736 B2 | 11/2005 | Järvenkylä |
| 6,962,168 B2 | 11/2005 | McDaniel et al. |
| 6,978,795 B2 | 12/2005 | Perrin |
| 7,055,545 B2 * | 6/2006 | Mascari et al. ............... 137/359 |
| 7,063,105 B1 | 6/2006 | Chen |
| 7,111,640 B2 | 9/2006 | Rhodes |
| 7,118,138 B1 | 10/2006 | Rowley et al. |
| 7,134,452 B2 | 11/2006 | Hiroshi et al. |
| 7,225,828 B2 | 6/2007 | Giagni et al. |
| 7,231,936 B2 | 6/2007 | Chang |
| 7,406,980 B2 | 8/2008 | Pinette |
| 7,766,043 B2 | 8/2010 | Thomas et al. |
| 7,793,677 B2 | 9/2010 | Pinette |
| 2002/0100139 A1 | 8/2002 | Rowley |
| 2002/0100510 A1 | 8/2002 | Otelli |
| 2002/0167171 A1 | 11/2002 | Becker et al. |
| 2003/0183286 A1 | 10/2003 | Yang |
| 2004/0007278 A1 | 1/2004 | Williams |
| 2004/0021120 A1 | 2/2004 | Turnau, III et al. |
| 2004/0060608 A1 | 4/2004 | Angus |
| 2004/0117906 A1 | 6/2004 | Baker et al. |
| 2004/0150132 A1 | 8/2004 | Rowley |
| 2004/0176503 A1 | 9/2004 | Czayka et al. |
| 2005/0005989 A1 | 1/2005 | Roloff |
| 2005/0194051 A1 | 9/2005 | Pinette |
| 2006/0108705 A1 | 5/2006 | Rowley |
| 2006/0118185 A1 | 6/2006 | Nobili |
| 2006/0124183 A1 | 6/2006 | Kuo |
| 2006/0130908 A1 | 6/2006 | Marty et al. |
| 2006/0170134 A1 | 8/2006 | Rowley et al. |
| 2006/0174955 A1 | 8/2006 | Huang |
| 2006/0200904 A1 | 9/2006 | Vogel et al. |
| 2006/0202142 A1 | 9/2006 | Marty et al. |
| 2007/0044852 A1 | 3/2007 | Pinette |
| 2007/0137714 A1 | 6/2007 | Meehan et al. |
| 2007/0137718 A1 | 6/2007 | Rushlander et al. |
| 2007/0271695 A1 | 11/2007 | Thomas et al. |
| 2008/0083898 A1 * | 4/2008 | Chen et al. .................... 251/208 |
| 2009/0189108 A1 * | 7/2009 | Ritter et al. .................... 251/304 |

FOREIGN PATENT DOCUMENTS

| | | |
|---|---|---|
| EP | 0 808 952 | 11/1997 |
| JP | 3094877 | 4/1991 |
| JP | 200132343 | 6/2001 |
| WO | WO 91/05191 | 4/1991 |
| WO | WO 00/61831 | 10/2000 |
| WO | WO 02/25022 | 3/2002 |
| WO | WO 2005/108829 | 11/2005 |
| WO | WO 2006/099273 | 9/2006 |
| WO | WO 2009/155529 | 12/2009 |
| WO | WO 2009/158497 | 12/2009 |
| WO | WO 2009/158498 | 12/2009 |

OTHER PUBLICATIONS

Dadex Polydex—PPR Pipe System for Hot and Cold Water Supply and Distribution, 2005, 2 pgs.

Dadex Polydex, 2005, 1 pg.

Dow, Plastic Pipes Europe, Middle East & Africa, Hot and Cold Water Pipes, 2007, 1 pg.

Dow, Plastic Pipes Europe, Middle East, & Africa, Dowlex PE-RT, 2007, 2 pgs.

Kerox, Ceramic Mixing Cartridge, Conventional Single-Lever Type, Model K-28, undated, 2 pgs.

Kerox, Standard Cartridges, 2005, 3 pgs.

Noveon, Inc.; Processing with TempRite® PEX Ensures Quality Piping, www.tempritepex.com/processingInstallation/processing. asp, at least as early as Jun. 7, 2005, 2 pgs.

PEX Association, What is PE-X?, at least as early as Jan. 31, 2007, 7 pgs.

PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.

SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.

Ticona Engineering Polymers, Engineering Polymers for Innovative Applications catalog, Mar. 2006, 16 pgs.

* cited by examiner

MOLDED WATERWAY FOR A TWO HANDLE FAUCET

CROSS-REFERENCE TO RELATED APPLICATIONS

This application is a national phase filing of PCT International Application Serial No. PCT/US2009/040207, filed Apr. 10, 2009, which claims the benefit of U.S. Provisional Patent Application Ser. No. 61/123,714, filed Apr. 10, 2008, the disclosures of which are expressly incorporated herein by reference.

BACKGROUND AND SUMMARY OF THE INVENTION

The present invention relates generally to plumbing fixtures and, more particularly, to a faucet including a molded waterway assembly.

Faucets are generally controlled by either a single handle which utilizes a mixing valve to proportion the flow of hot water and cold water to a delivery spout, or dual handles which utilize two separate valves to independently control the flow of hot water and cold water. In a conventional dual handle faucet, the hot water and cold water valve bodies, which house the respective hot water and cold water valves, are each typically connected to an upstream waterway through a conventional mechanical connection, such as mating threads. Further, each valve body is typically connected to a separate downstream waterway. In certain examples, the valve bodies and the downstream waterways are sand cast from brass, or are machined from brass components and combined through brazing. Sand casting is typically a manual low-tech process that if not controlled properly may lead to failures through pin holes or porosity. One of the potential problems with a brazing connection is that undesirable materials, such as harmful metals, may be communicated from the brazing material into the water passageway through the brazed connection. Further, brazing is often a variable process that may lead to failures. Additionally, brazing often requires an etching operation to be performed subsequent thereto.

According to an illustrative embodiment of the present disclosure, a waterway assembly for use with a centerset faucet includes a first flexible tube including opposing proximal and distal ends, and a second flexible tube including opposing proximal and distal ends. The proximal end of the second flexible tube is positioned in spaced relation to the proximal end of the first flexible tube. A coupler includes a first valve support having a first valve interface and overmolded about the proximal end of the first flexible tube, and a second valve support having a second valve interface and overmolded about the proximal end of the second flexible tube. An outlet tube interface is positioned intermediate the first valve support and the second valve support. The outlet tube interface is configured to be in fluid communication with an outlet tube. A first fluid connector is fluidly coupled intermediate the first valve support and the outlet tube interface, and a second fluid connector is fluidly coupled intermediate the second valve support and the outlet tube interface.

According to a further illustrative embodiment of the present disclosure, a waterway assembly for use with a centerset faucet includes a hot water inlet tube having opposing proximal and distal ends, and a cold water inlet tube including opposing proximal and distal ends. A coupler includes an outlet positioned intermediate the proximal end of the hot water inlet tube and the proximal end of the cold water inlet tube. The coupler is an overmold of the proximal end of the hot water inlet tube and the proximal end of the cold water inlet tube. The overmold includes a hot water fluid connector including an internal waterway fluidly coupling the hot water inlet tube to the outlet, and a cold water fluid connector including an internal waterway fluidly coupling the cold water inlet tube to the outlet.

According to another illustrative embodiment of the present disclosure, a faucet for connection to a hot water supply and a cold water supply is provided. The faucet includes a hot water inlet tube having opposing proximal and distal ends, the distal end configured to be fluidly coupled to the hot water supply. The faucet further includes a cold water inlet tube having opposing proximal and distal ends, the distal end configured to be fluidly coupled to the cold water supply A coupler includes a hot water valve support including a hot water valve interface and overmolded about the proximal end of the hot water inlet tube, and a cold water valve support including a cold water valve interface and overmolded about the proximal end of the cold water inlet tube. An outlet tube interface is positioned intermediate the hot water valve support and the cold water valve support. A hot water fluid connector includes an internal waterway fluidly coupling the hot water inlet tube to the outlet tube interface, and a cold water fluid connector includes an internal waterway fluidly coupling the cold water inlet tube to the outlet tube interface. The hot water valve support, the cold water valve support, the outlet tube interface, the hot water fluid connector, and the cold water fluid connector are integrally molded from a polymer. A hot water valve is operably coupled to the hot water valve support to control the flow rate of hot water through the internal waterway of the hot water fluid connector, and a cold water valve is operably coupled to the cold water valve support to control the flow rate of cold water through the internal waterway of the cold water fluid connector.

According to another illustrative embodiment of the present disclosure, a method of forming a waterway for a faucet includes the steps of providing a mold including a cavity, providing a first tube including opposing proximal and distal ends, providing a second tube including opposing proximal and distal ends, placing the proximal end of the first tube within the cavity of the mold, inserting a first mandrel into the proximal end of the first tube, placing the proximal end of the second tube within the cavity of the mold in spaced relation to the proximal end of the first tube, and inserting a second mandrel into the proximal end of the second tube. The method further includes the steps of positioning a pin within the cavity of the mold intermediate the first mandrel and the second mandrel, injecting a flowable material within the cavity of the mold, withdrawing the first mandrel and the second mandrel to form first and second valve interfaces, and withdrawing the pin to form an outlet interface.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
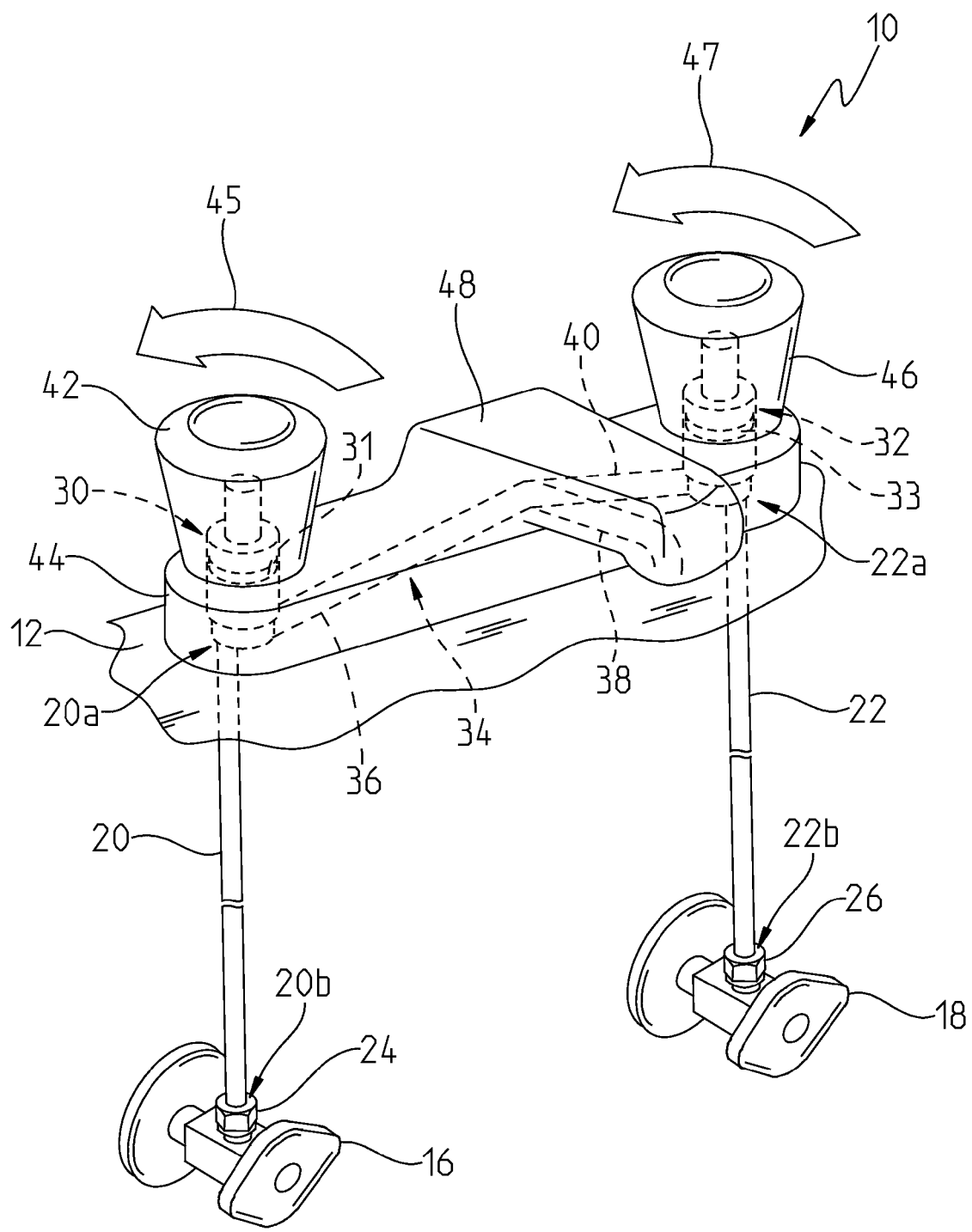
FIG. 1 is a perspective view of an illustrative faucet of the present disclosure mounted to a sink deck and fluidly coupled to hot and cold water supply lines.

Referring initially to FIG. 1, an illustrative embodiment faucet 10 is shown mounted to a sink deck 12. The faucet 10 is fluidly coupled to hot and cold water supplies 16 and 18 through conventional stops (not shown). Hot and cold water fluid transport components, or inlet tubes 20 and 22 include opposing proximal and distal ends 20a, 22a, and 20b, 22b, respectively. Illustratively, the tubes 20 and 22 are flexible such that the distal ends 20b, 22b may be manipulated relative to the respective proximal ends 20a, 22a. Fluid couplings 24 and 26 are provided at distal ends 20b and 22b for connecting with the hot and cold water supplies 16 and 18, respectively. It should be appreciated that the inlet tubes 20 and 22 may be directly coupled to the respective hot and cold water stops through couplings 24 and 26 or, alternatively, to intermediate hot and cold water risers (not shown).

Illustratively, the tubes 20 and 22 are formed of a polymer, such as an olefin or a polyethylene. In one illustrative embodiment, the tubes 20 and 22 are formed of a polyethylene which has been cross-linked to form cross-linked polyethylene (PEX). However, it should be appreciated that other suitable materials may be substituted therefor.

A hot water valve 30 is fluidly coupled to the hot water inlet tube 20, while a cold water valve 32 is fluidly coupled to the cold water inlet tube 22. A coupler or molded waterway 34 includes a first or hot water internal waterway 36 fluidly coupling the hot water valve 30 to an outlet tube 38. The coupler 34 further includes a second or cold water internal waterway 40 fluidly coupling the cold water valve 32 to the outlet tube 38.

Figure 4:
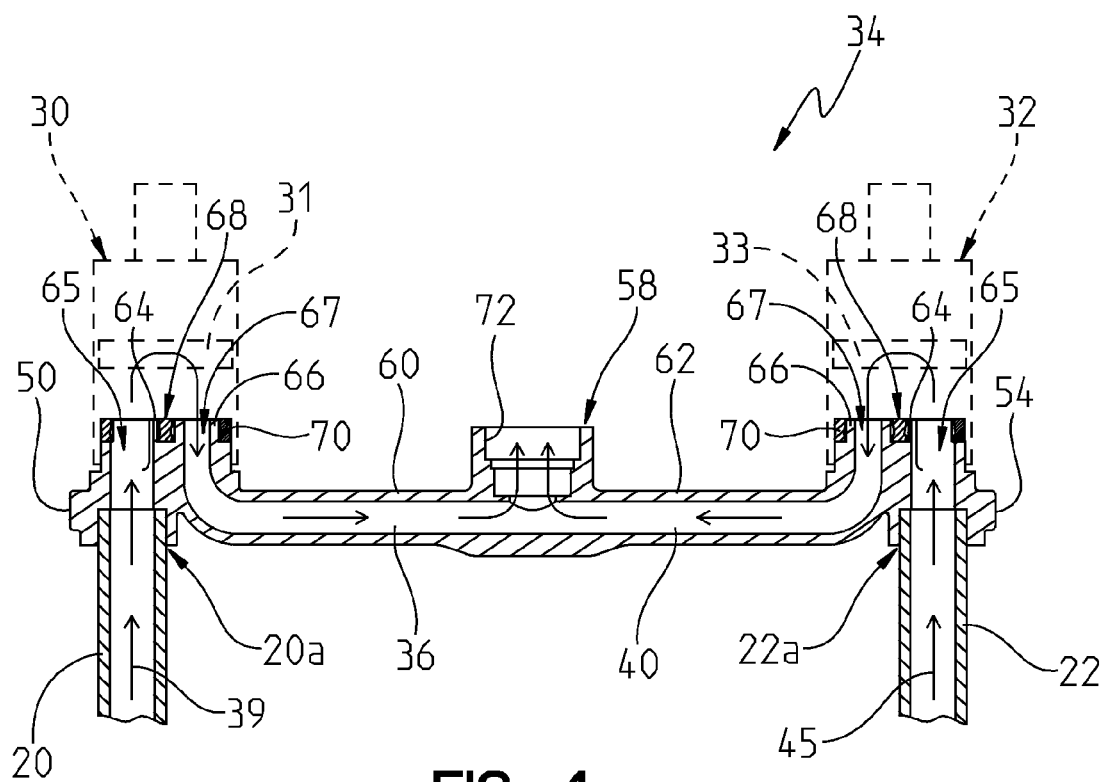
FIG. 4 is a cross-sectional view taken along line 4-4 of FIG. 2.

The hot water valve 30 includes a valve member 31 that is movable between a first position where water from the hot water inlet tube 20 is in fluid communication with the internal waterway 36, and a second position where water from the hot water inlet tube 20 is not in fluid communication with the internal waterway 36. Arrows 39 in FIG. 4 represent hot water flow through valve 30 from inlet tube 20 to waterway 36, and subsequently to outlet tube 38. In one illustrative embodiment, the valve member 31 of hot water valve 30 is a rotatable disc wherein the rotational position of the disc 31 is adjusted through a hot water user input, such as a handle 42. Handle 42 generally extends above an escutcheon 44 of the faucet 10 and is rotatable in the direction of arrow 45 in FIG. 1. It should be appreciated that the handle 42 may be replaced with other user inputs, such as a lever.

Similarly, cold water valve 32 includes a valve member 33 that is movable between a first position where water from the cold water inlet tube 22 is in fluid communication with internal waterway 40, and a second position where water from the cold water inlet tube 22 is not in fluid communication with internal waterway 40. Arrows 45 in FIG. 4 represent cold water flow through valve 32 from inlet tube 22 to waterway 40, and subsequently to outlet tube 38. In one illustrative embodiment, the valve member 33 of cold water valve 32 is a rotatable disc that may be rotatably adjusted through a cold water user input, such as a handle 46. Handle 46 generally extends above escutcheon 44 of the faucet 10 and is rotatable in the direction of arrow 47 in FIG. 1. As with handle 42, handle 46 may be replaced with other user inputs, such as a lever. A delivery spout 48 is supported above the escutcheon 44 and receives the outlet tube 38. While the drawings illustrate the coupler 34 supporting the base of the delivery spout 48 rearward of the valves 30 and 32, in other illustrative embodiments the coupler 34 may be oriented 180 degrees from that shown in FIGS. 1 and 2 such that the base of the delivery spout 48 is positioned forward of the valves 30 and 32. Such an orientation may provide additional space for a conventional drain lift rod (not shown) of faucet 10.

In one illustrative embodiment, the valves 30 and 32 may be of the type disclosed in U.S. Patent Application Ser. No. 61/132,664, filed Jun. 20, 2008, the disclosure of which is expressly incorporated by reference herein. Additional exemplary rotatable valves are disclosed in U.S. Pat. Nos. 3,645, 493; 4,453,567; 4,577,835; and 4,700,928.

Figure 2:
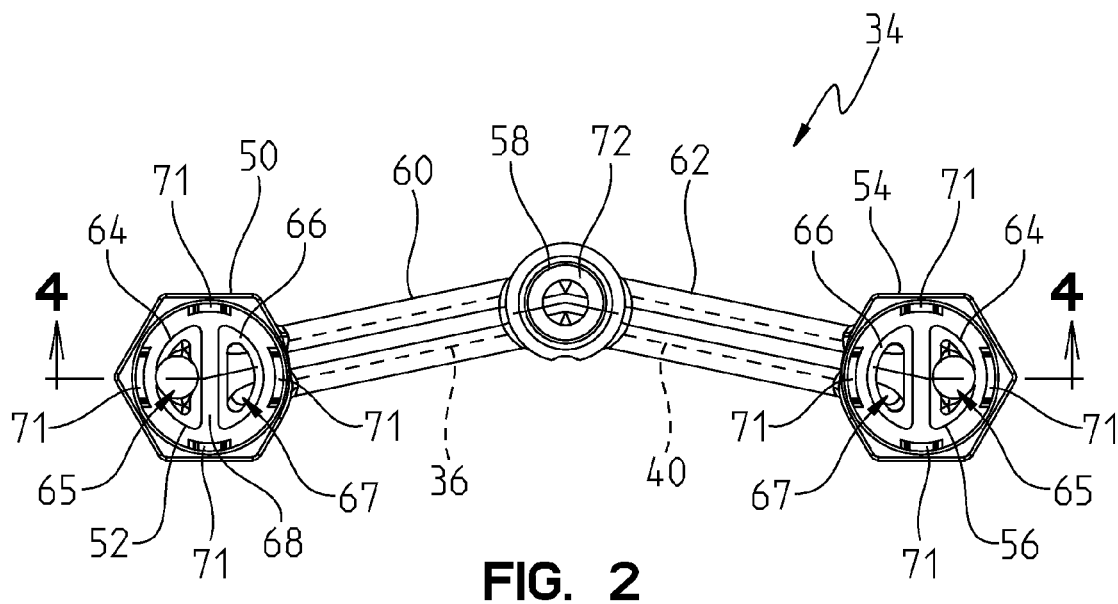
FIG. 2 is a top plan view of an illustrative molded waterway for use with the faucet of FIG. 1.

With reference now to FIGS. 2-5, the coupler 34 includes a first valve support 50 having a first valve interface 52 and overmolded about the proximal end 20a of the hot water inlet tube 20. The coupler 34 further includes a second valve support 54 having a second valve interface 56 and overmolded about the proximal end 22a of the cold water inlet tube 22. An outlet tube interface 58 is positioned intermediate the first valve support 50 and the second valve support 54 and is configured to be in fluid communication with the outlet tube 38. A first or hot water fluid connector 60 defines the internal waterway 36 fluidly coupling the first valve support 50 and the outlet tube interface 58. A second or cold water fluid connector 62 defines the second internal waterway 40 and fluidly couples the second valve support 54 and the outlet tube interface 58. While the outlet tube interface 58 is shown in FIG. 2 positioned rearward of the valve supports 50 and 54, in other illustrative embodiments the outlet tube interface 58 may be substantially aligned with, or positioned forward of, the valve supports 50 and 54.

As further detailed herein, the coupler 34 is formed of a flowable material which is overmolded around the proximal ends 20a and 22a of the inlet tubes 20 and 22 while defining the internal waterways 36 and 40 for hot and cold water from the valves 30 and 32, respectively. While any suitable material may be used to form coupler 34, a polymer, including thermoplastics and thermosets, is utilized in the illustrative embodiment. More particularly, the coupler 34 is illustratively molded as a single integral component including first and second valve supports 50 and 54, fluid connectors 60 and 62 defining internal waterways 36 and 40, and outlet tube interface 58. In the illustrative embodiment detailed herein, the coupler 34 is formed of polyethylene which has been overmolded around the inlet tubes 20 and 22 and subsequently cross-linked. It should be noted that reinforcing members, such as glass fibers, may be provided within the polyethylene of the coupler 34.

The basic principles of overmolding plumbing connections on tubes are shown in U.S. Pat. Nos. 5,895,695; 6,082,780; 6,287,501; and 6,902,210. U.S. Patent Application Publication Nos. 2007/0271695 and 2007/0044852 also disclose illustrative overmolding about water inlet tubes.

Figure 2A:
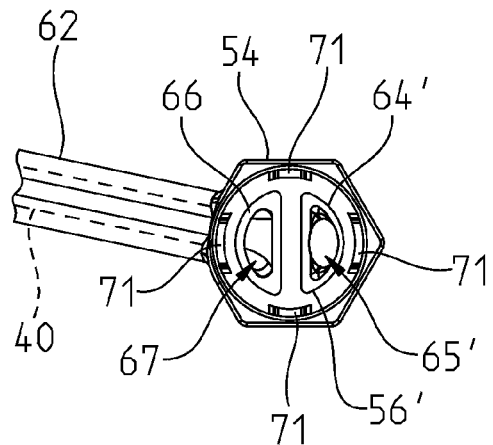
FIG. 2A is a detailed top plan view of a further illustrative valve support for the molded waterway of FIG. 2.
Figure 3:
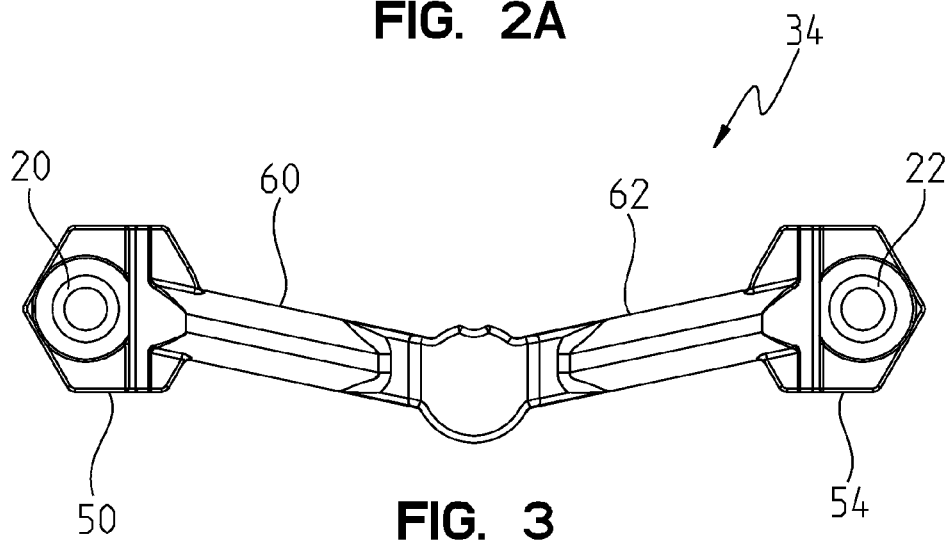
FIG. 3 is a bottom plan view of the molded waterway of FIG. 2.
Figure 5:
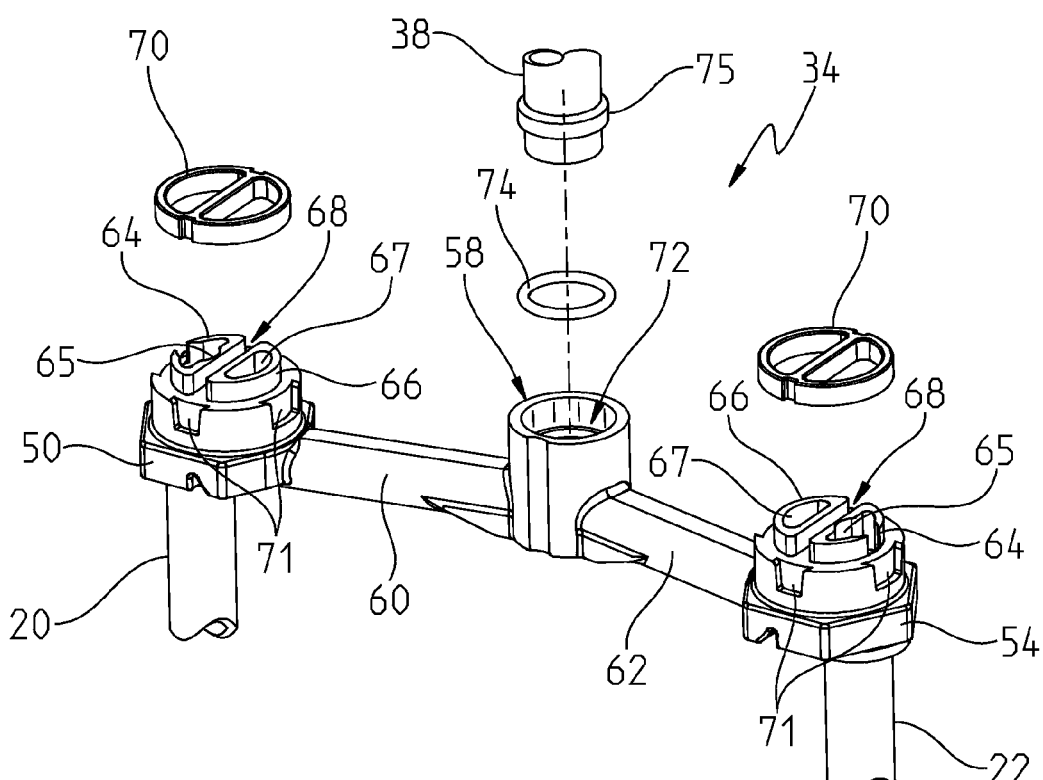
FIG. 5 is a perspective view of the molded waterway of FIG. 2.

With reference to FIGS. 2, 4, and 5, valve interfaces 52 and 56 of the first and second valve supports 50 and 54 each include an upwardly projecting inlet wall 64 extending around an inlet port 65, and an upwardly projecting outlet wall 66 extending around an outlet port 67. The inlet and outlet walls 64 and 66 define a trench 68 for receiving a resilient gasket 70 (FIGS. 4 and 5). The gasket 70 may be formed of an elastomer and provides a seal intermediate the respective valves 30, 32 and valve support 50, 54. While the inlet tubes 20 and 22 as shown in FIG. 2 define a circular cross-section, it should be noted that the cross-sectional shape of the inlet tubes 20 and 22 within the valve supports 50 and 54 may vary. For example, the cross-section of the proximal ends 20a and 22a of inlet tubes 20 and 22 may be oval or D-shaped in order to facilitate material flow during the molding operation for defining an increased and/or substantially consistent thickness of inlet wall 44. With reference to FIG. 2A, inlet port 65' is defined by the proximal end 22a of inlet tube 22 as substantially oval shaped thereby providing a substantially continuous and uniform inlet wall 64' for valve interface 56'. The increased thickness of portions of inlet wall 64' may provide additional support for the valves 30 and 32 and sealing between the valve interfaces 52' and 56' and the valves 30 and 32.

A plurality of locating notches 71 are illustratively formed around a periphery of the valve supports 50 and 54 and are configured to receive locating tabs of the valves 30 and 32, respectively, to facilitate orientation therebetween. The outlet tube interface 58 includes a counterbore 72 for receiving an o-ring 74 to provide a seal intermediate a female coupler ring or collar 75 of the outlet tube 38 and the interface 58.

Figure 6:
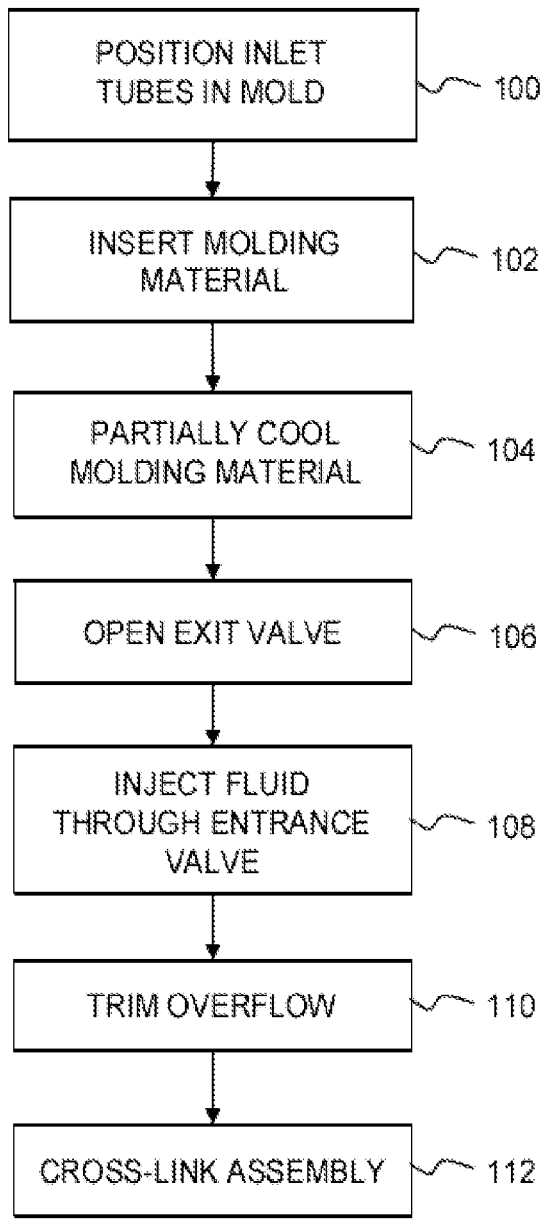
FIG. 6 is a flow chart of an illustrative method of forming the molded waterway of FIG. 2.
Figure 7:
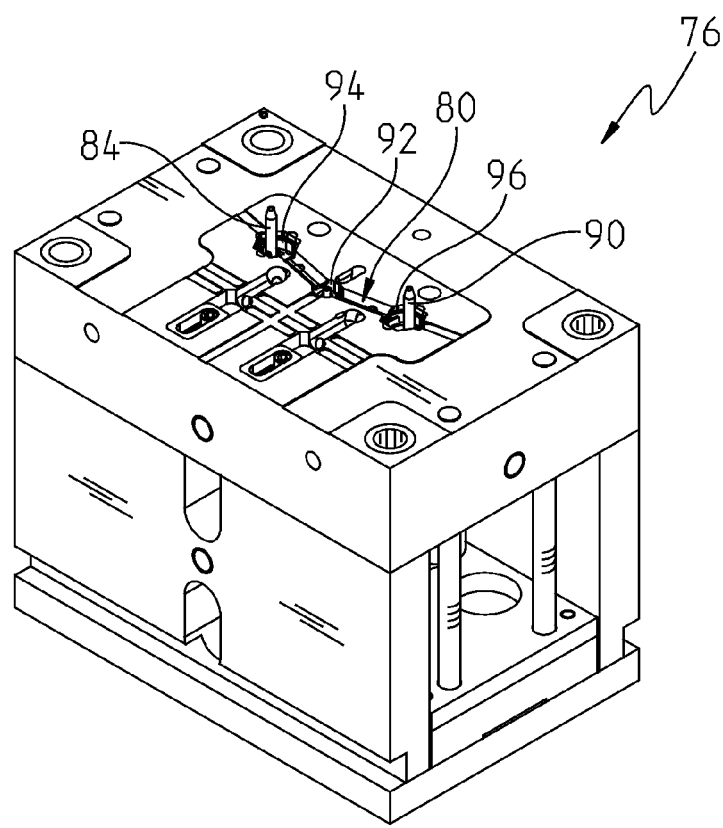
FIG. 7 is a perspective view of an illustrative bottom mold portion for use in forming the waterway of FIG. 2.
Figure 8:
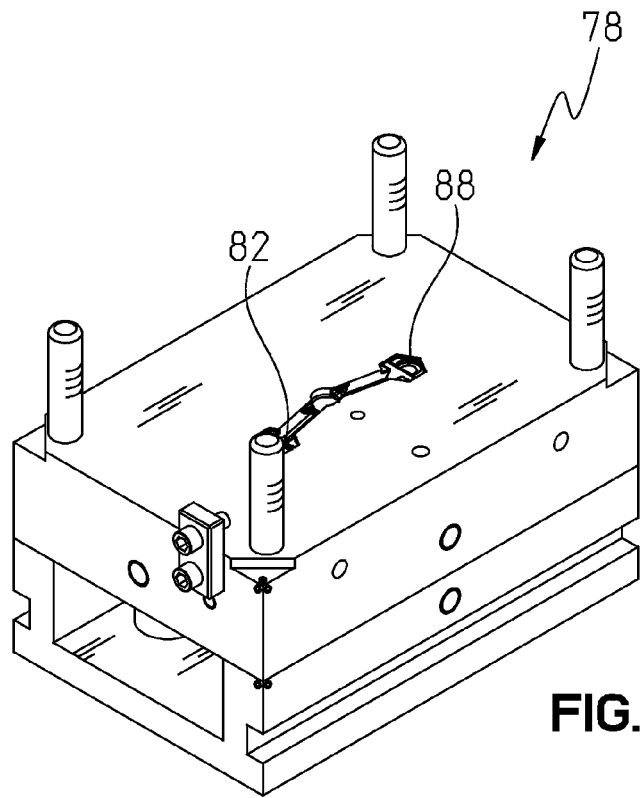
FIG. 8 is a perspective view of an illustrative upper mold portion for forming the waterway of FIG. 2.
Figure 9:
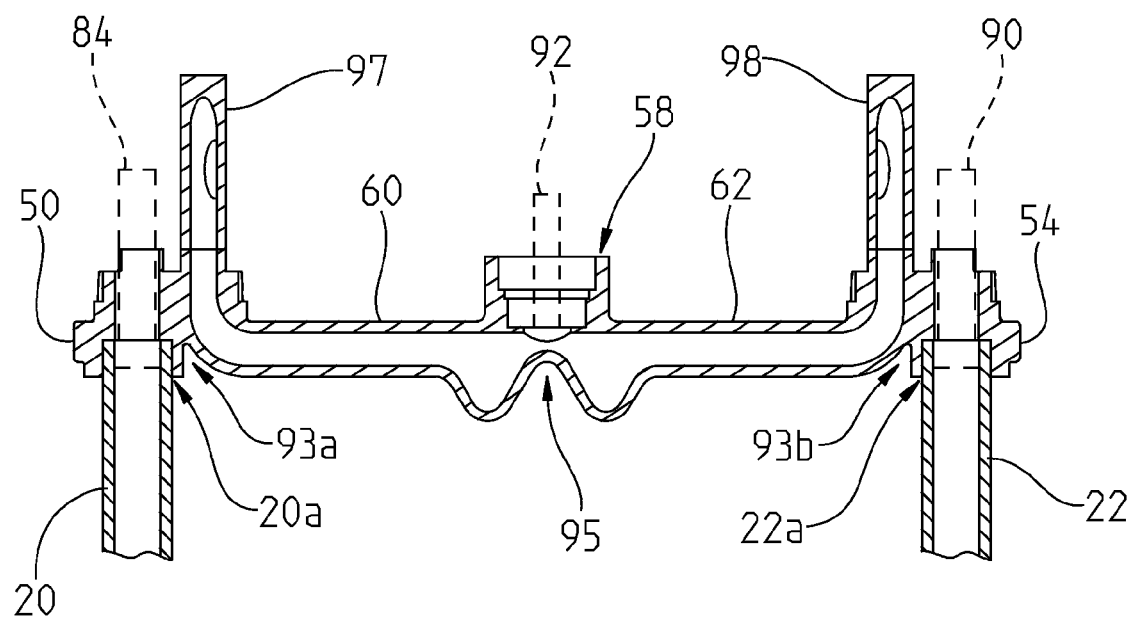
FIG. 9 is a cross-sectional view of an illustrative molded waterway prior to trimming overflow portions and including a fluid directing feature.

With reference now to FIGS. 6-8, an illustrative method of forming the waterway assembly of the present disclosure includes the use of a mold including a lower mold portion 76 (FIG. 7), and an upper mold portion 78 (FIG. 8) defining a cavity 80 therebetween. As shown at step 100 in FIG. 6, the proximal end 20a of the hot water inlet tube 20 is passed through an opening 82 in the upper mold portion 78 and a first mandrel 84 of the lower mold portion 76 is positioned therewithin. Similarly, the proximal end 22a of the cold water inlet tube 22 extends through an opening 88 in the upper mold portion 78 and has a second mandrel 90 of the lower mold portion positioned therein. The mandrels 84 and 90 properly locate the tubes 20 and 22 and prevent the tubes 20 and 22 from moving during the molding process. The mandrels 84 and 90 also prevent the walls of the tubes 20 and 22 from collapsing during the molding process. A pin 92 is supported within the cavity 80 of the mold intermediate the first mandrel 84 and the second mandrel 90 and is configured to define the outlet tube interface 58.

At step 102, a flowable material, illustratively a polymer such as polyethylene, is injected into the cavity 80 of the mold. The pin 92 illustratively includes a fluid conduit extending therethrough for providing a fluid connection for a gas assist molding process. More particularly, once the flowable material has started to cool or solidify at step 104, a fluid, illustratively a gas such as compressed air, is injected through the pin 92 defining the outlet tube interface 58 (step 108). Simultaneously or immediately beforehand, a valve (not shown) is opened allowing displaced polymer to exit the final part configuration into overflow chambers 94 and 96 (step 106). The compressed air displaces plastic from the still molten center of the part into overflow chambers 94 and 96. In one illustrative embodiment, fluid directing features 93a, 93b, and 95 are molded into the coupler 34 to assist in preventing turbulence and directing air from the pin 92 to the overflow chambers 94 and 96.

The overflow chambers 94 and 96 are designed such that the resulting overflow members 97 and 98 may be removed, via manual or automatic trimming (step 110), from the final part configuration. The remnants of the overflow members 97 and 98 will be part of the molded features that define the interfaces with the control valves 30 and 32. The part remaining after the trimming operation is the waterway or coupler 34 providing fluid communication from both control valves 30 and 32 to the outlet tube 38.

In certain illustrative embodiments, the polyethylene of the tubes 20 and 22 and coupler 34 are then cross-linked to form cross-linked polyethylene (PEX) at step 112. In other words, the polyethylene of tubes 20 and 22 and coupler 34 (which have not been cross-linked or have been only partially cross-linked) are cross-linked following the overmolding process. While it is envisioned that any form of suitable cross-linking may be utilized to form the PEX of tubes 20 and 22 and coupler 34, in one illustrative embodiment the polyethylene is cross-linked by bombarding it with electromagnetic (gamma) or high energy electron (beta) radiation. In the illustrative embodiment, no subsequent machining operations are required on surfaces of the valve interfaces 52 and 56 and the outlet tube interface 58 to sealingly engage with gaskets 70 and o-ring 74, respectively.

While the precise composition of the tubes 20 and 22 and overmolded coupler 34 are not required to be of any specified polymer, in general, there are several guidelines which are applicable in the practice of the illustrative embodiment. It is of course, recognized that the precise operating conditions utilized in the overmolding process are well-known in the art and are specific to each molded polymer. It is well within the skill of the art to determine the applicable conditions which will result in the appropriate overmolded coupler 34 and tubes 20 and 22. The tubes 20 and 22 and coupler 34 may be a thermoplastic or a thermoset. Illustratively, the polymer overmolded coupler 34 should be capable of forming a leak-proof bond, either chemical or physical, with the polymer of the tubes 20 and 22.

Illustrative and non-limiting examples of the polymers which may be used in various combinations to form the tubes 20 and 22 as well as polymers which may be used in the overmolding process would include: polyacetals, typically highly crystalline linear thermoplastic polymers of oxymethylene units; poly(meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from the aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers illustratively satisfy at least two simultaneous conditions. First, the tubes 20 and 22 illustratively do not soften and begin melt flow to the point where they lose structural integrity and second, the overmolded coupler 34 is illustratively capable of forming an essentially leak-proof interface with the plastic conduit, preferably through either a chemical and/or physical bond between the underlying plastic and the overmolded plastic. According to the illustrative embodiment, the tubes 20 and 22 are capable of maintaining structural integrity during the overmolding conditions during which the overmolded polymer is in melt flow.

While using polymer compositions which have differing softening points is one way to achieve the above objectives, there are alternatives, one of which would include the use of two compositions which have the same softening point, but which are of different thickness. Through manipulation of the time, temperature and pressure conditions experienced during the molding operation, the tubes 20, 22 would not experience melt flow, even though they had a similar softening point or range. It is also possible that through the incorporation of various additives in the polymeric compositions, e.g., glass fibers, heat stabilizers, anti-oxidants, plasticizers, etc., the softening temperatures of the polymers may be controlled.

In an illustrative embodiment of the invention, the composition of the overmolded coupler 34 will be such that it will be capable of at least some melt fusion with the composition of the tubes 20 and 22, thereby maximizing the leak-proof characteristics of the interface between the tubes 20 and 22 and overmold coupler 34. There are several means by which this may be effected. One of the simplest procedures is to insure that at least a component of each tube 20, 22 and that of the overmold coupler 34 is the same. Alternatively, it would be possible to insure that at least a portion of the polymer composition of each tube 20, 22 and that of the overmold coupler 34 is sufficiently similar or compatible so as to permit the melt fusion or blending or alloying to occur at least in the interfacial region between the exterior of the tube 20, 22 and the interior region of the overmold coupler 34. Another manner in which to state this would be to indicate that at least a portion of the polymer compositions of the tube 20, 22 and the overmold coupler 34 are miscible.

In yet another illustrative embodiment, composites of rubber/thermoplastic blends are useful in adhering to thermoplastic materials used in the tubes 20 and 22. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials.

Although the invention has been described in detail with reference to certain preferred embodiments, variations and modifications exist within the spirit and scope of the invention as described and defined in the following claims.

The invention claimed is:

1. A waterway assembly for use with a centerset faucet, the waterway assembly comprising:
   a first flexible tube including opposing proximal and distal ends;
   a second flexible tube including opposing proximal and distal ends, the proximal end of the second flexible tube being positioned in spaced relation to the proximal end of the first flexible tube;
   a coupler formed of a polymer, and including a first valve support including a first valve interface and overmolded about the proximal end of the first flexible tube, the proximal end of the first flexible tube having an oval cross-section, a second valve support including a second valve interface and overmolded about the proximal end of the second flexible tube, the proximal end of the second flexible tube having an oval cross-section, an outlet tube interface positioned intermediate the first valve support and the second valve support, the outlet tube interface configured to be in fluid communication with an outlet tube, a first fluid connector fluidly coupled intermediate the first valve support and the outlet tube interface, and a second fluid connector fluidly coupled intermediate the second valve support and the outlet tube interface, wherein the first valve support, the second valve support, the outlet tube interface, the first fluid connector, and the second fluid connector are integrally formed as a single continuous body;
   wherein the first valve interface and the second valve interface include inlet and outlet openings cooperating with valve assemblies; and
   wherein the first valve interface and the second valve interface include upwardly projecting wall members defining an upwardly facing channel for receiving a seal, the upwardly projecting wall members including straight and arcuate portions defining a D-shaped cross-section.

2. The waterway assembly of claim 1, wherein the first flexible tube and the second flexible tube are formed of a polymer.

3. The waterway assembly of claim 1, wherein the first flexible tube and the second flexible tube are formed of cross-linked polyethylene.

4. The waterway assembly of claim 1, wherein the coupler is formed of cross-linked polyethylene.

5. The waterway assembly of claim 1, wherein the first valve interface and the second valve interface include locating features for cooperating with valve assemblies.

6. The waterway assembly of claim 1, wherein the first flexible tube is configured to extend in a generally vertical direction downwardly from the first valve support, the second flexible tube is configured to extend in a generally vertical direction downwardly from the second valve support, the first fluid connector is configured to extend in a generally horizontal direction, and the second fluid connector is configured to extend in a generally horizontal direction.

7. The waterway assembly of claim 1, wherein the upwardly projecting wall members include an upwardly projecting inlet wall extending around the inlet opening, and an upwardly projecting outlet wall extending around the outlet opening, the inlet wall and the outlet wall defining an intermediate trench for receiving the seal.

8. A waterway assembly for use with a centerset faucet, the waterway assembly comprising:
   a hot water inlet tube including opposing proximal and distal ends;
   a cold water inlet tube including opposing proximal and distal ends;
   a coupler formed of a polymer, including an outlet positioned intermediate the proximal end of the hot water inlet tube and the proximal end of the cold water inlet tube, the coupler being an overmold of the proximal end of the hot water inlet tube and the proximal end of the cold water inlet tube, the overmold including a hot water fluid connector including an internal waterway fluidly coupling the hot water inlet tube to the outlet, and a cold water fluid connector including an internal waterway fluidly coupling the cold water inlet tube to the outlet wherein the coupler through melt fusion defines a single continuous body with the hot water inlet tube and the cold water inlet tube;
   wherein the coupler further comprises a first valve support including a first valve interface and overmolded about the proximal end of the hot water inlet tube, the proximal end of the hot water inlet tube having an oval cross-section, a second valve support including a second valve interface and overmolded about the proximal end of the cold water inlet tube, the proximal end of the cold water inlet tube having an oval cross-section;
   the first valve interface and the second valve interface include inlet and outlet openings cooperating with valve assemblies; and
   wherein the first valve interface and the second valve interface including upwardly projecting wall members defining an upwardly facing channel for receiving a seal, the upwardly projecting wall members including straight and arcuate portions defining a D-shaped cross-section.

9. The waterway assembly of claim 8, wherein the hot water inlet tube and the cold water inlet tube are formed of a flexible material such that the distal end of the hot water inlet tube may be adjusted relative to the distal end of the cold water inlet tube.

10. The waterway assembly of claim 9, wherein the hot water inlet tube and the cold water inlet tube are formed of a polymer.

11. The waterway assembly of claim 10, wherein the hot water inlet tube and the cold water inlet tube are formed of cross-linked polyethylene.

12. The waterway assembly of claim 8, wherein the first valve interface and the second valve interface include locating features for cooperating with valve assemblies.

13. The waterway assembly of claim 8, wherein the outlet comprises an interface configured to be in fluid communication with an outlet tube.

14. The waterway assembly of claim 8, wherein the coupler is formed of cross-linked polyethylene.

15. The waterway assembly of claim 8, wherein the upwardly projecting wall members include an upwardly projecting inlet wall extending around the inlet opening, and an upwardly projecting outlet wall extending around the outlet opening, the inlet wall and the outlet wall defining an intermediate trench for receiving the seal.

16. A faucet for connection to a hot water supply and a cold water supply, the faucet comprising:
   a hot water inlet tube including opposing proximal and distal ends, the distal end configured to be fluidly coupled to the hot water supply;
   a cold water inlet tube including opposing proximal and distal ends, the distal end configured to be fluidly coupled to the cold water supply;
   a coupler including a hot water valve support including a hot water valve interface and overmolded about the proximal end of the hot water inlet tube, the proximal end of the hot water inlet tube having an oval cross-section, a cold water valve support including a cold water valve interface and overmolded about the proximal end of the cold water inlet tube, the proximal end of the cold water inlet tube having an oval cross-section, an outlet tube interface positioned intermediate the hot water valve support and the cold water valve support, a hot water fluid connector including an internal waterway fluidly coupling the hot water inlet tube to the outlet tube interface, and a cold water fluid connector including an internal waterway fluidly coupling the cold water inlet tube to the outlet tube interface;
   the hot water valve support, the cold water valve support, the outlet tube interface, the hot water fluid connector, and the cold water fluid connector being integrally molded from a polymer as a single continuous body;
   a hot water valve operably coupled to the hot water valve support to control the flow rate of hot water through the internal waterway of the hot water fluid connector;
   a cold water valve operably coupled to the cold water valve support to control the flow rate of cold water through the internal waterway of the cold water fluid connector;
   wherein the hot water valve interface and the cold water valve interface include locating features for cooperating with the hot water and cold water valves; and
   wherein the hot water valve interface and the cold water valve interface include upwardly projecting wall members defining an upwardly facing channel for receiving a seal, the upwardly projecting wall members including straight and arcuate portions defining a D-shaped cross-section.

17. The faucet of claim 16, further comprising a delivery spout, and an outlet tube received within the delivery spout and configured to be in fluid communication with the outlet tube interface of the coupler.

18. The faucet of claim 16, wherein the hot water inlet tube and the cold water inlet tube are formed of a polymer.

19. The faucet of claim 18, wherein the hot water inlet tube and the cold water inlet tube are formed of cross-linked polyethylene.

20. The faucet of claim 16, wherein the coupler is formed of a polymer.

21. The faucet of claim 20, wherein the coupler is formed of cross-linked polyethylene.

22. The waterway assembly of claim 16, wherein the upwardly projecting wall members include an upwardly projecting inlet wall extending around an inlet opening, and an upwardly projecting outlet wall extending around an outlet opening, the inlet wall and the outlet wall defining an intermediate trench for receiving the seal.

* * * * *